United States Patent
Murata

(10) Patent No.: US 9,690,529 B2
(45) Date of Patent: Jun. 27, 2017

(54) DEVICE SELECTING APPARATUS, AND PRINTING SYSTEM AND COMPUTER READABLE MEDIUM FOR THE SAME

(75) Inventor: Mareyuki Murata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/335,828

(22) Filed: Dec. 22, 2011

(65) Prior Publication Data

US 2012/0212759 A1    Aug. 23, 2012

(30) Foreign Application Priority Data

Feb. 23, 2011   (JP) ................................ 2011-037327

(51) Int. Cl.
  *G06F 3/12*   (2006.01)
(52) U.S. Cl.
  CPC .......... *G06F 3/1285* (2013.01); *G06F 3/1204* (2013.01); *G06F 3/1226* (2013.01); *G06F 3/1232* (2013.01)
(58) Field of Classification Search
  USPC ...................... 358/1.14, 1.15, 1.13
  See application file for complete search history.

(56) References Cited

U.S. PATENT DOCUMENTS

| 2003/0002077 A1* | 1/2003 | Shima ........................ 358/1.15 |
| 2004/0076159 A1 | 4/2004 | Utsubo |
| 2004/0243697 A1 | 12/2004 | Otsuka et al. |
| 2005/0088681 A1* | 4/2005 | Hosoda ...................... 358/1.14 |
| 2005/0180791 A1 | 8/2005 | Kujirai |
| 2006/0034264 A1* | 2/2006 | Dlugos ................. H04L 12/24 370/352 |
| 2007/0030512 A1* | 2/2007 | Oka ............................. 358/1.15 |
| 2007/0041046 A1* | 2/2007 | Lee et al. ..................... 358/1.14 |
| 2007/0206219 A1* | 9/2007 | Yanagi ................. G06F 3/1204 358/1.15 |
| 2008/0019290 A1* | 1/2008 | Suzuki ......................... 370/254 |

(Continued)

FOREIGN PATENT DOCUMENTS

| CN | 1658146 A | 8/2005 |
| JP | 2001-265551 A | 9/2001 |

(Continued)

OTHER PUBLICATIONS

Japan Patent Office, Notification of Reasons for Rejection for Japanese Patent Application No. 2011-037327 (counterpart to above-captioned patent application), mailed Jul. 30, 2013.
European Patent Office, Extended European Search Report for European patent application No. 11192627.5 (counterpart to above-captioned patent application), mailed May 24, 2013.
Japan Patent Office, Notification of Reasons for Rejection for Japanese Patent Application No. 2011-037327 (counterpart Japanese patent application), dispatched Feb. 19, 2013.

(Continued)

*Primary Examiner* — Richa Mishra
(74) *Attorney, Agent, or Firm* — Baker Botts L.L.P.

(57) ABSTRACT

A device selecting apparatus is provided, which includes a display unit, a communication unit configured to connect the device selecting apparatus communicably with one or more devices therethrough, a controller configured to display, on the display unit, a list of one or more identifiers of the one or more devices, to receive, from a specified device, device information for identifying the specified device via the communication unit, and to perform a selection process to put, into a selected state, an identifier of the specified device identified by the device information received via the communication unit, on the list displayed on the display unit.

6 Claims, 10 Drawing Sheets

(56) References Cited

U.S. PATENT DOCUMENTS

| | | | |
|---|---|---|---|
| 2008/0240740 A1* | 10/2008 | Asano | 399/2 |
| 2008/0252928 A1* | 10/2008 | Takatani | 358/1.15 |
| 2009/0089457 A1* | 4/2009 | Zhan | 710/4 |
| 2009/0141303 A1* | 6/2009 | Azuchi | G06K 15/00 |
| | | | 358/1.15 |
| 2010/0007905 A1 | 1/2010 | Murashita | |
| 2010/0149577 A1 | 6/2010 | Kamasuka | |
| 2011/0216355 A1* | 9/2011 | Takei | G06F 15/00 |
| | | | 358/1.15 |

FOREIGN PATENT DOCUMENTS

| | | | |
|---|---|---|---|
| JP | 2002-269022 A | 9/2002 |
| JP | 2004-118426 A | 4/2004 |
| JP | 2004-357047 A | 12/2004 |
| JP | 2008-262409 A | 10/2008 |
| JP | 2009-104586 A | 5/2009 |
| JP | 2009-134423 A | 6/2009 |
| JP | 2010-020403 A | 1/2010 |
| JP | 2010-147721 A | 7/2010 |

OTHER PUBLICATIONS

Japan Patent Office, Notification of Reasons for Rejection for Japanese Patent Application No. 2011-037327 (counterpart to above-captioned patent application), mailed Mar. 27, 2014.

State Intellectual Property Office of the People's Republic of China, Notification of First Office Action for Chinese Patent Application No. 201210031707.X (related to above-captioned patent application), mailed Jun. 5, 2014.

Japan Patent Office, Notification of Reasons for Rejection for Japanese Patent Application No. 2011-037327 (foreign counterpart to above-captioned patent application), mailed Oct. 21, 2014.

State Intellectual Property Office of the People's Republic of China, Notification of Second Office Action issued for Chinese Patent Application No. 201210031707.X (related to above-captioned patent application), mailed Dec. 22, 2014.

European Patent Office, Communication Pursuant to Article 94(3) EPC for Application No. EP 11 192 627.5-1957, dated Oct. 29, 2015.

* cited by examiner

DEVICE SELECTING APPARATUS, AND PRINTING SYSTEM AND COMPUTER READABLE MEDIUM FOR THE SAME

CROSS-REFERENCE TO RELATED APPLICATION

This application claims priority under 35 U.S.C. §119 from Japanese Patent Application No. 2011-037327 filed on Feb. 23, 2011. The entire subject matter of the application is incorporated herein by reference.

BACKGROUND

Technical Field

The following description relates to one or more techniques for selecting an identifier of an intended device from identifiers listed on a screen.

Related Art

So far, a technique to assist a user to select an intended one of printers has been known, which technique is adapted to accept an input to specify a condition for narrowing down possible printers (candidate printers), display a list of printer information (such as IP addresses and model names) of the possible printers conforming to the specified condition, and prompt the user to select the printer information of the intended printer from the list of printer information.

SUMMARY

According to the known technique, IP addresses and/or model names are displayed as the printer information. Hence, when the user does not know the IP address or the model name of the intended printer, it is hard for the user to select the intended printer even from the narrowed-down possible printers.

Aspects of the present invention are advantageous to provide one or more improved techniques that make it possible to select an identifier of an intended device from listed identifiers even though a user does not know the identifier of the intended device.

According to aspects of the present invention, a device selecting apparatus is provided, which includes a display unit, a communication unit configured to connect the device selecting apparatus communicably with one or more devices therethrough, and a controller configured to display, on the display unit, a list of one or more identifiers of the one or more devices, to receive, from a specified device, device information for identifying the specified device via the communication unit, and to perform a selection process to put, into a selected state, an identifier of the specified device identified by the device information received via the communication unit, on the list displayed on the display unit.

According to aspects of the present invention, further provided is a printing system, which includes a printer including a printer-side interface configured to be connected with a communication network, an accepting unit configured to accept a transmission instruction to transmit printer information for identifying the printer, and a printer-side controller configured to transmit the printer information via the printer-side interface in response to accepting the transmission instruction via the accepting unit, and a computer including a computer-side interface configured to be connected communicably with the printer via the communication network, a display unit configured to display a list of identifiers of devices connected with the computer via the communication network, and a computer-side controller configured to, in response to receiving the printer information from the printer via the computer-side interface, perform a selection process to put, into a selected state, an identifier of the printer identified by the printer information received via the computer-side interface, on the list displayed on the display unit.

According to aspects of the present invention, further provided is a non-transitory computer readable medium storing instructions that, when executed by a processor coupled with a display unit and a communication unit through which the processor is connected communicably with one or more devices, cause the processor to display, on the display unit, a list of one or more identifiers of the one or more devices, to receive, from a specified device, device information for identifying the specified device via the communication unit, and to perform a selection process to put, into a selected state, an identifier of the specified device identified by the device information received via the communication unit, on the list displayed on the display unit.

BRIEF DESCRIPTION OF THE ACCOMPANYING DRAWINGS

FIG. 1 schematically shows an overall configuration of a communication network in a first embodiment according to one or more aspects of the present invention.

Figure 6:
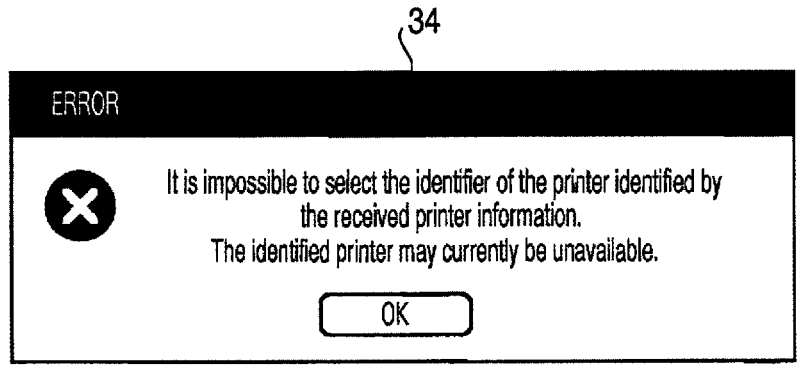

FIG. 6 exemplifies an error message window in the first embodiment according to one or more aspects of the present invention.

Figure 7:
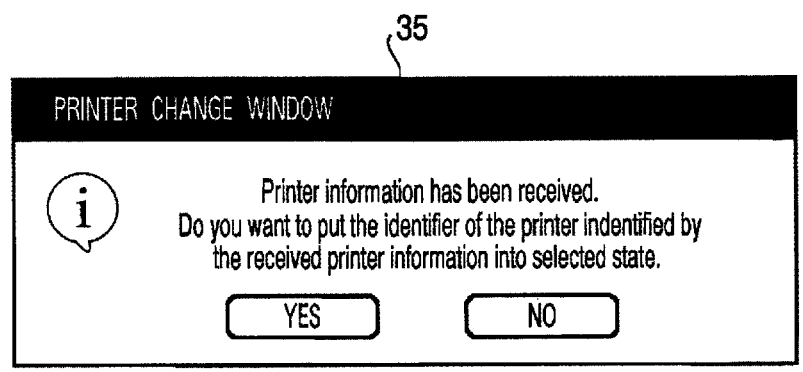

FIG. 7 exemplifies a printer change window in the first embodiment according to one or more aspects of the present invention.

Figure 8:
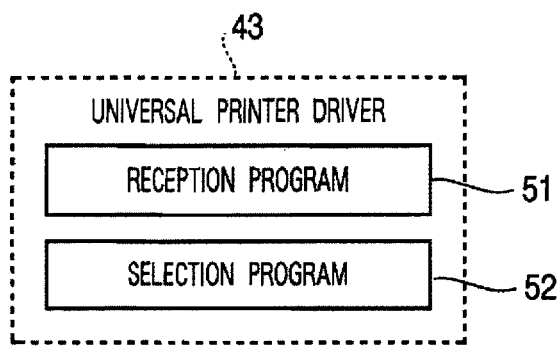

FIG. 8 is a block diagram showing a logical configuration of the universal printer driver in a second embodiment according to one or more aspects of the present invention.

Figure 9:
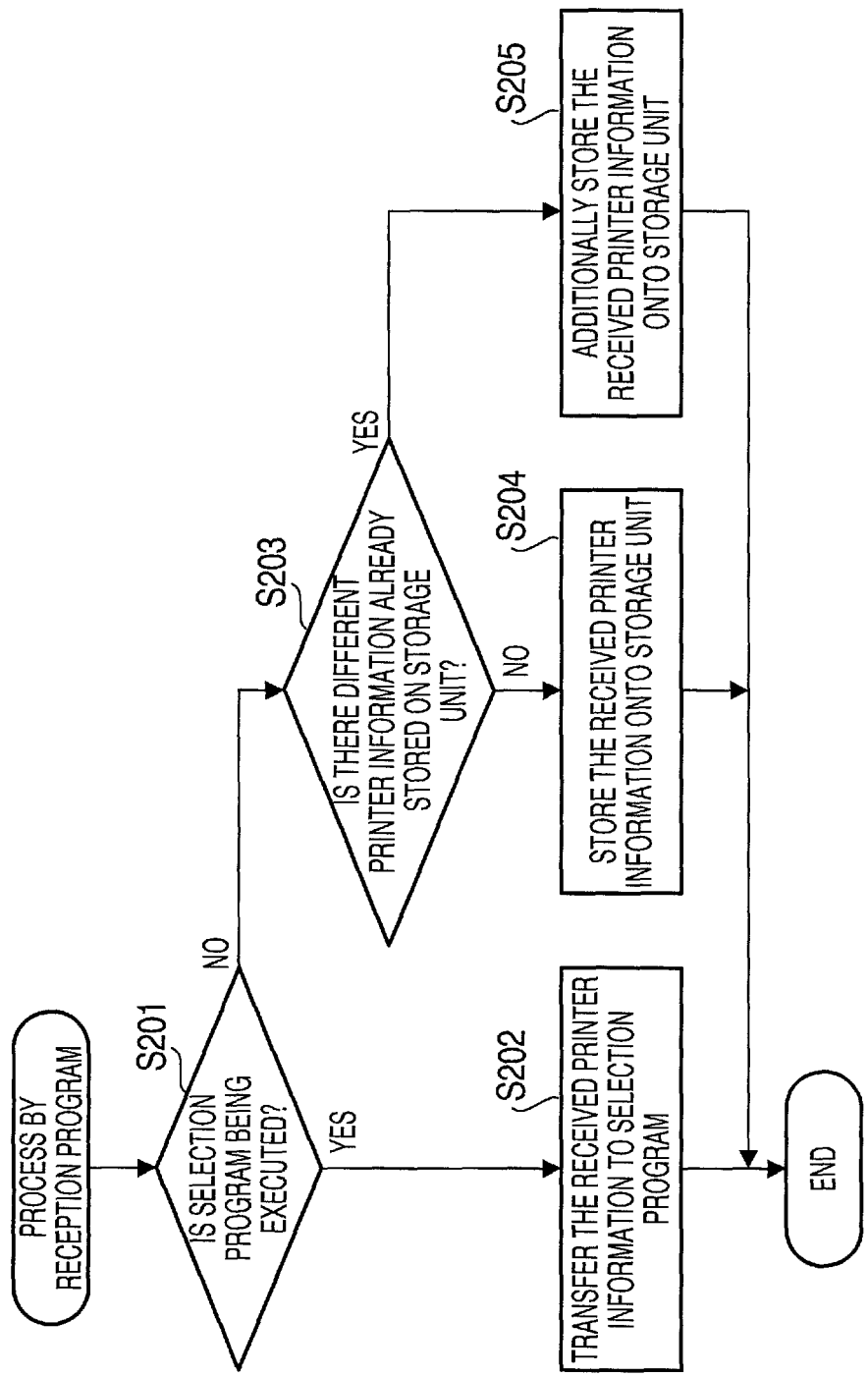

FIG. 9 is a flowchart showing a procedure of a process to be performed when a reception program is executed in the second embodiment according to one or more aspects of the present invention.

Figure 10:
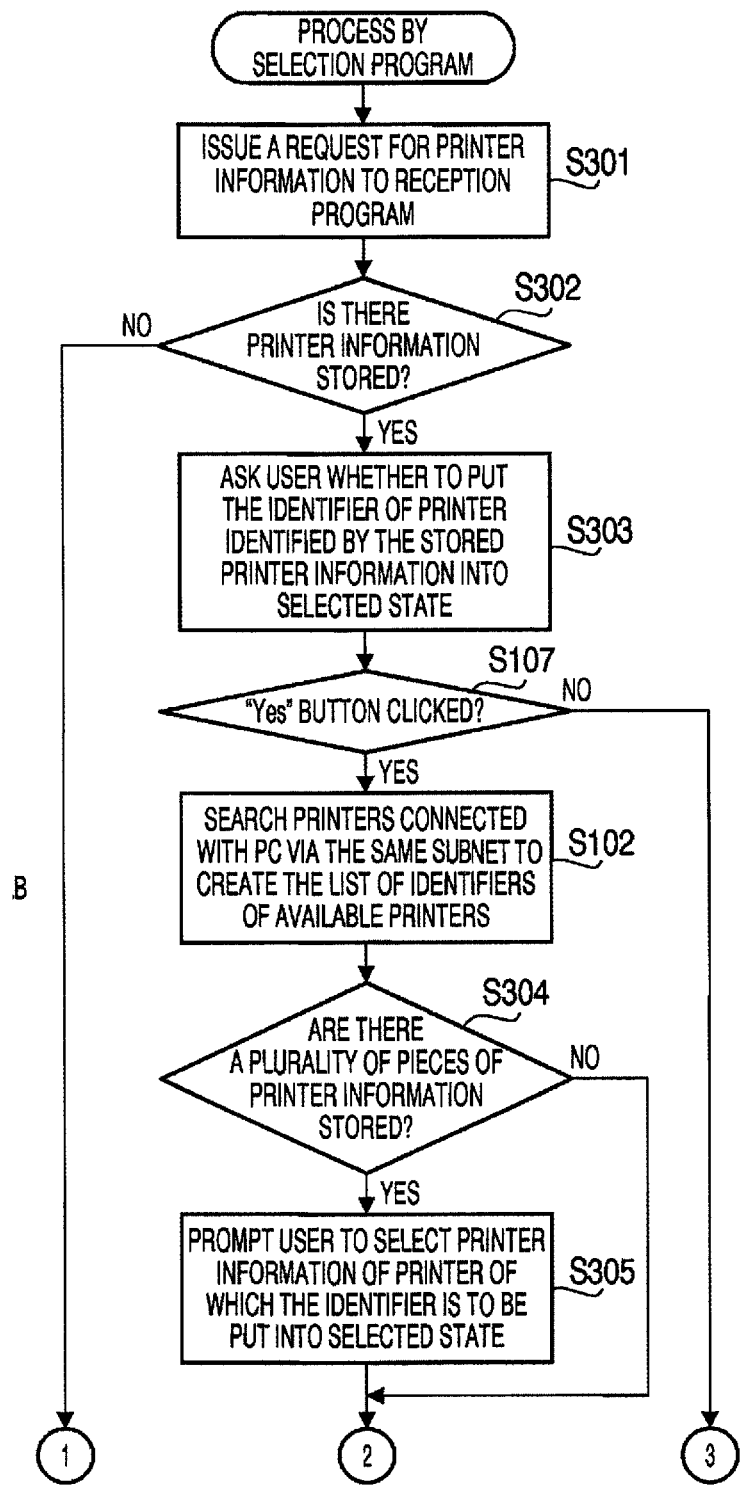
Figure 11:
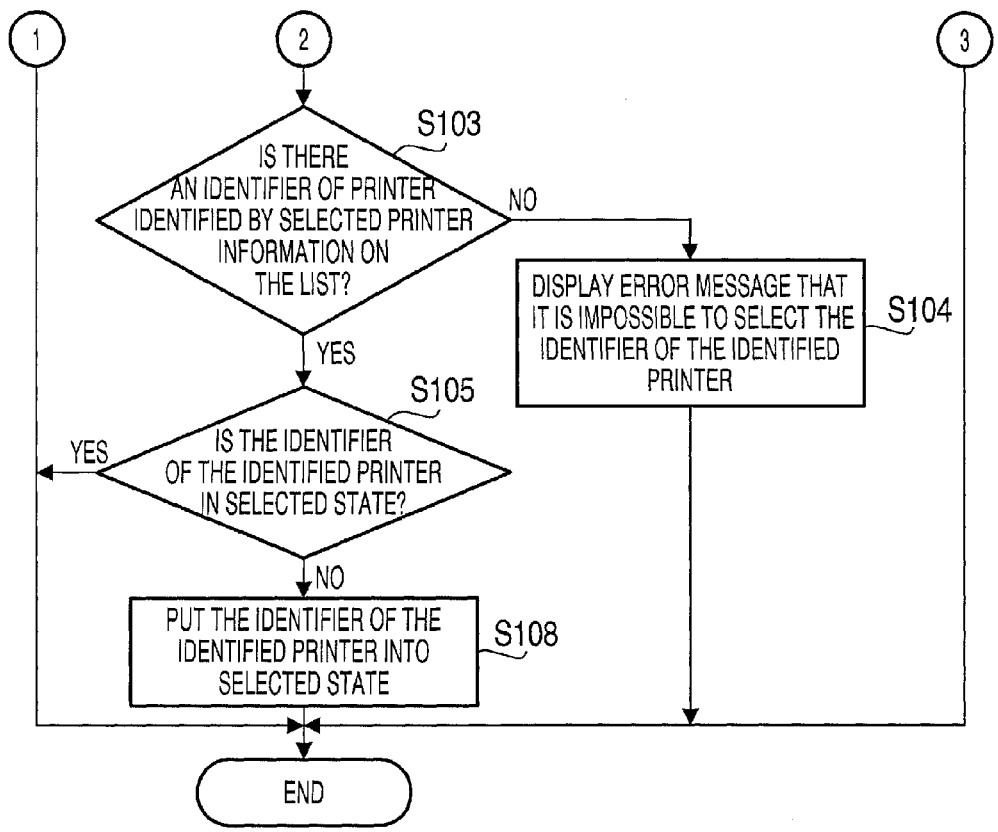

FIGS. 10 and 11 are flowcharts showing a procedure of a process to be performed when a selection program is executed in the second embodiment according to one or more aspects of the present invention.

FIG. 11 is a flowchart showing a procedure of the scaling process to enlarge and reduce the thumbnail images in the first embodiment according to one or more aspects of the present invention.

Figure 12:
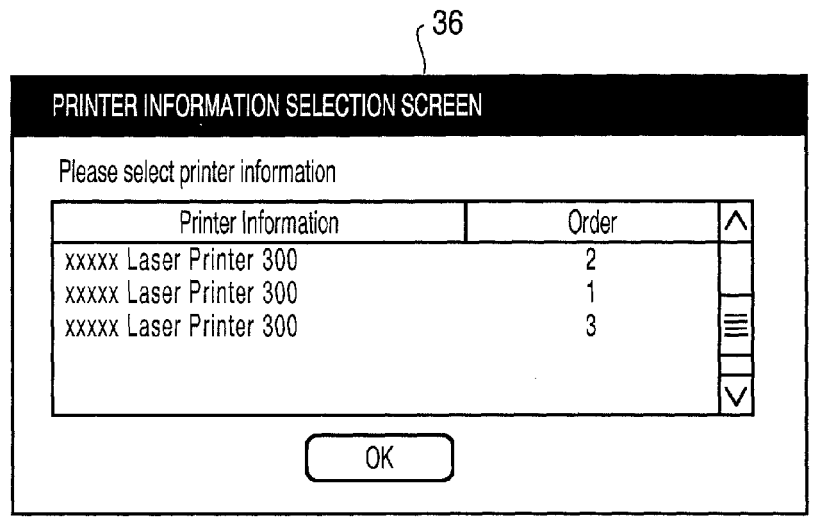

FIG. 12 exemplifies a printer information selection screen in the third embodiment according to one or more aspects of the present invention.

Figure 13:
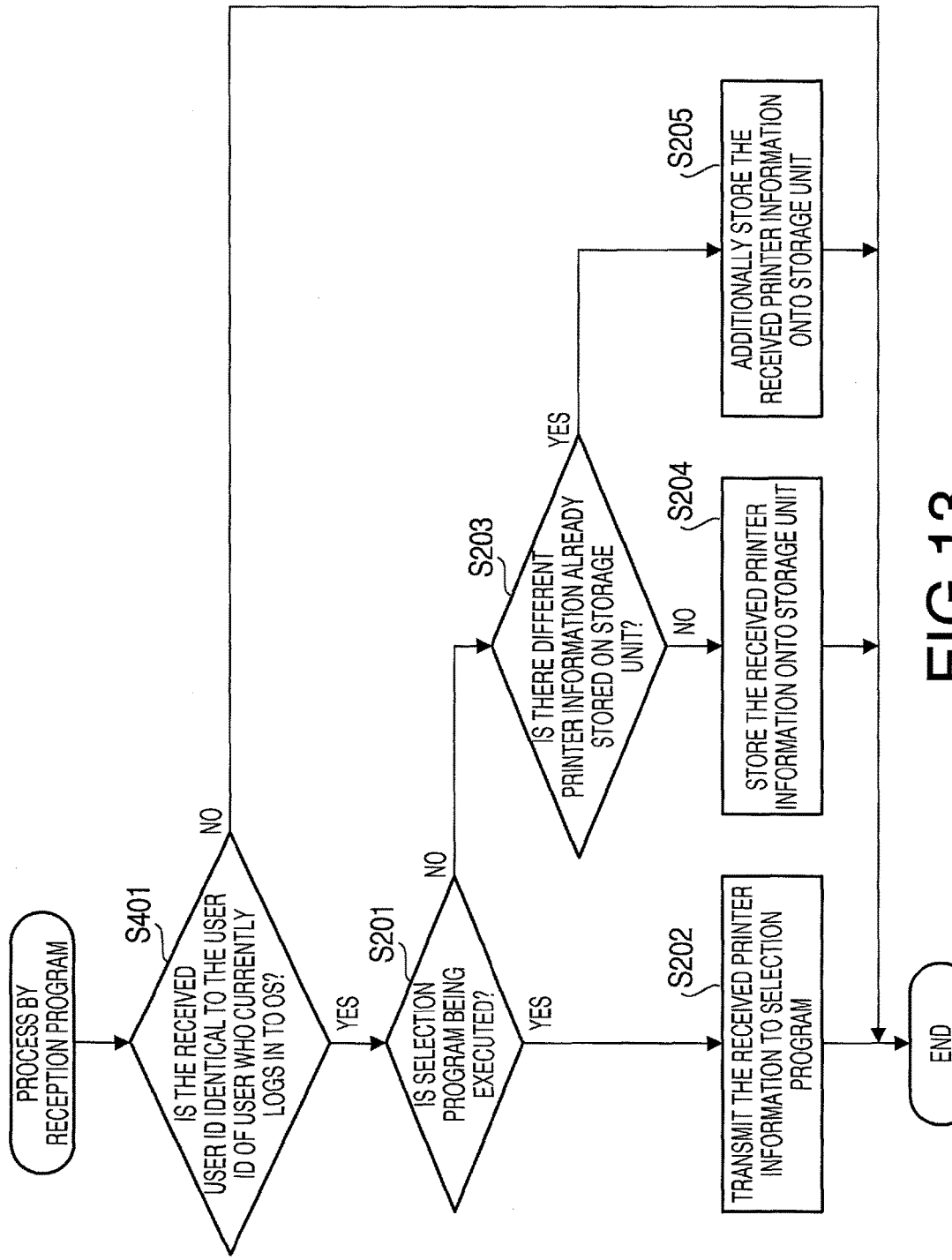

FIG. 13 is a flowchart showing a procedure of a process to be performed when a reception program is executed in the fourth embodiment according to one or more aspects of the present invention.

Figure 14:
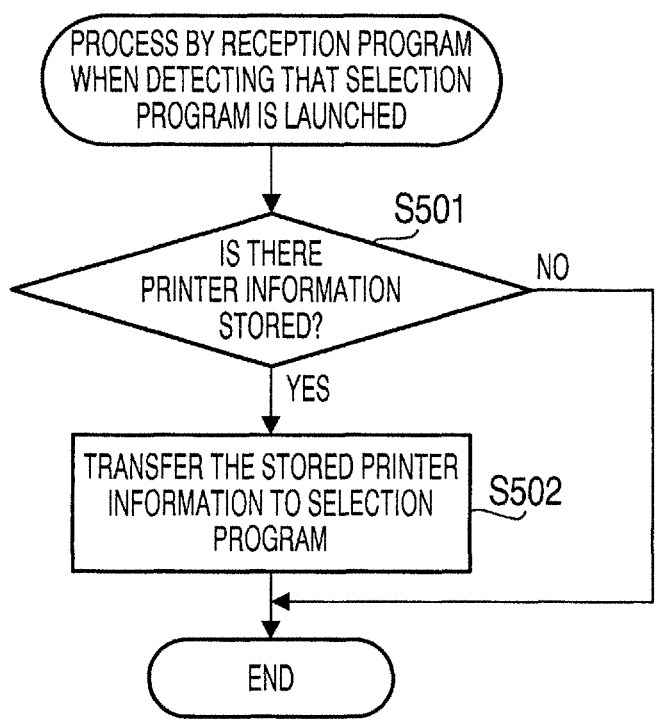

FIG. 14 is a flowchart showing a procedure of a process to be performed when a reception program detects that a selection program is launched in a fifth embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

First Embodiment (1) Overall Configuration of Communication Network

Figure 1:
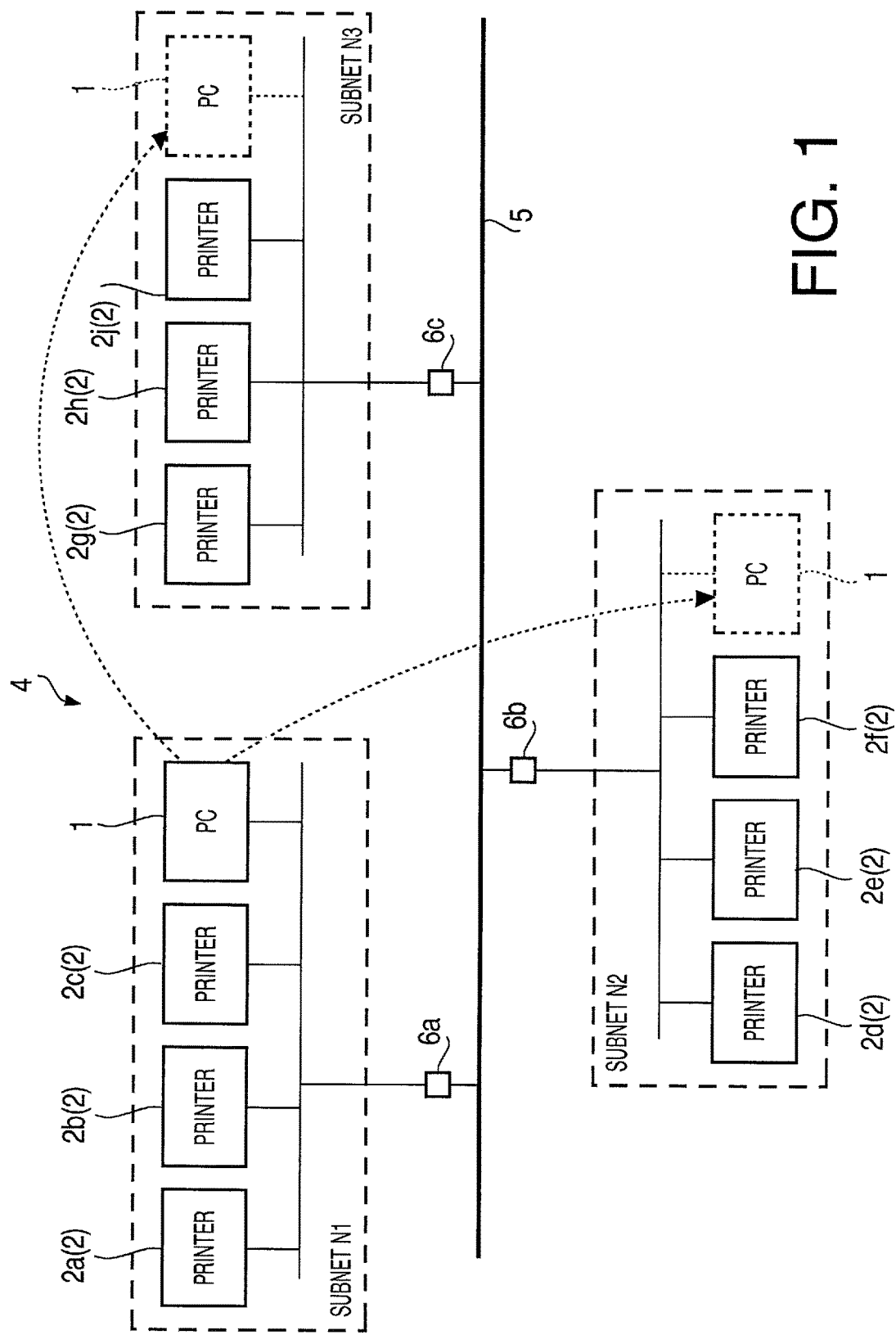

FIG. 1 schematically shows an overall configuration of a communication network 4 connected with a personal computer (PC) 1 in a first embodiment. The communication network 4 includes subnets N1, N2, and N3, and a backbone network 5 connected with the subnets N1 to N3. The subnets N1 to N3 are connected with the backbone network 5 via routers 6a to 6c, respectively.

For example, the PC 1 is a portable notebook computer configured such that a user can move carrying it. The PC 1 has a universal printer driver 43 (see FIG. 2) installed therein. The universal printer driver 43 is configured to control a plurality of printers 2. When moving to a subnet, connecting the PC 1 with the subnet, and controlling the printer 2 connected with the subnet using the universal printer driver 43, the user is allowed to cause the printer 2 connected with the subnet to perform printing.

The plurality of printers 2 may be of the same model or of different models, respectively. Further, the plurality of printers 2 may include a printer of a model uncontrollable by the universal printer driver 43. In the following description, a device which is simply referred to as the "printer 2" denotes one of the printers 2a to 2j.

(2) Configuration of Computer

Figure 2:
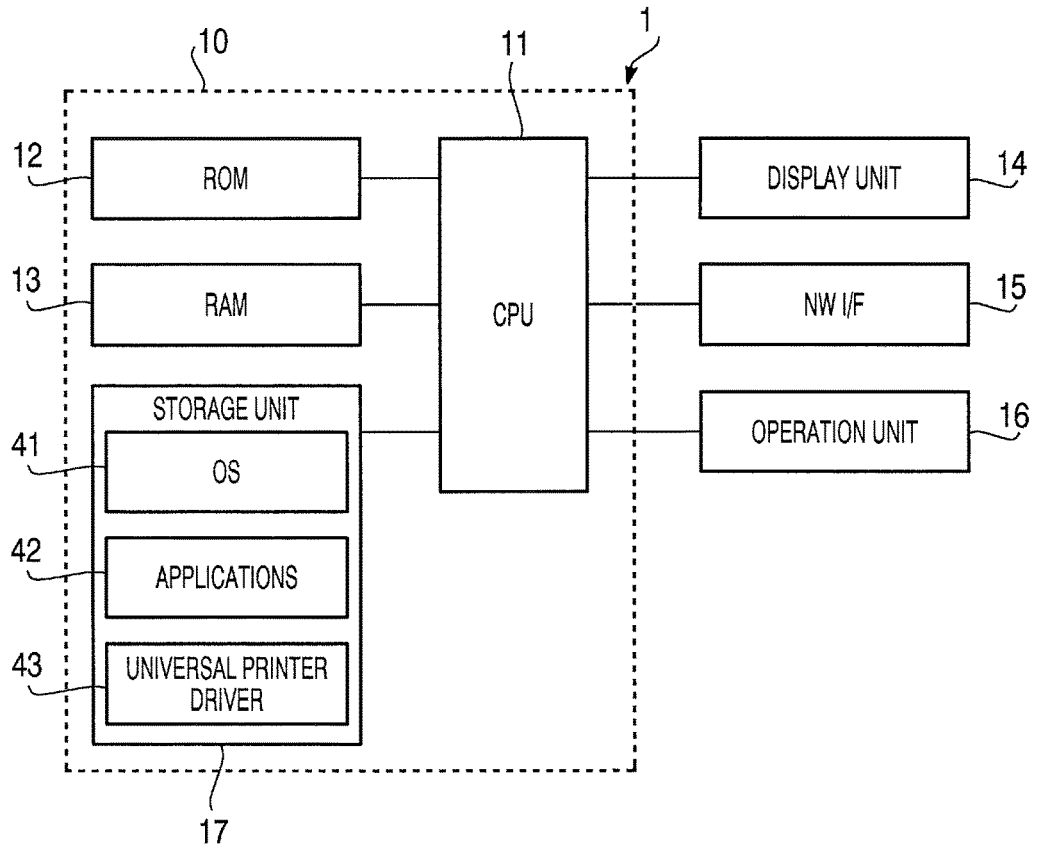
FIG. 2 is a block diagram schematically showing an electrical configuration of a personal computer (PC) in the first embodiment according to one or more aspects of the present invention.

FIG. 2 is a block diagram schematically showing an electrical configuration of the PC 1. As shown in FIG. 2, the PC 1 includes a CPU 11, a ROM 12, a RAM 13, a display unit 14, a network interface (NW I/F) 15, an operation unit 16, and a storage unit 17. It is noted that a plurality of elements, such as the CPU 11, the ROM 12, the RAM 13, and the storage unit 17, form a controller 10 configured to take overall control of the PC 1.

Specifically, the CPU 11 is configured to control each element of the PC 1 when executing various kinds of programs stored on the ROM 12 and the storage unit 17. The ROM 12 stores thereon various kinds of programs to be executed by the CPU 11 and various kinds of data. The CPU 11 uses the RAM 13 as a main memory when performing various processes. The display unit 14 includes a display device such as a liquid crystal display device, and a drive circuit for driving the display device.

The network interface 15 is connected communicably with external devices such as the printers 2 via the communication network 4. The operation unit 16 includes one or more input devices such as a mouse and a keyboard. The storage unit 17 includes a non-volatile memory such as a hard disk drive and a flash memory. The storage unit 17 is configured to store various kinds of data and various kinds of programs such as an operating system (OS) 41, application programs 42 (e.g., a word processor, a spreadsheet, and an image editor), and the universal printer driver 43.

(3) Configuration of Printers

Figure 3:
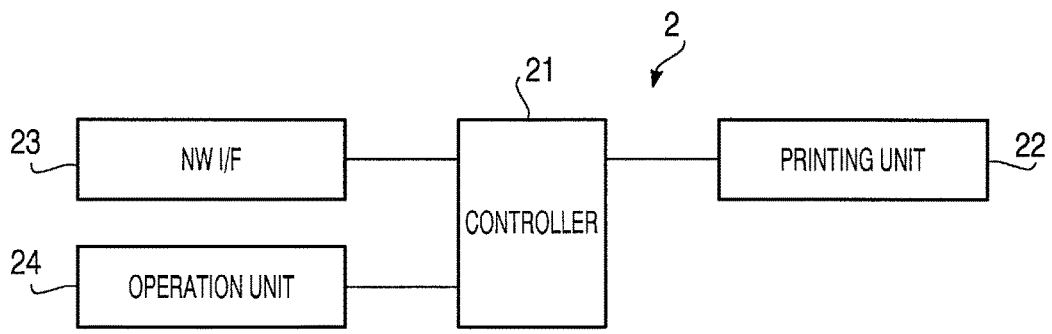
FIG. 3 is a block diagram schematically showing an electrical configuration of a printer of a model controllable by a universal printer driver in the first embodiment according to one or more aspects of the present invention.

FIG. 3 is a block diagram schematically showing an electrical configuration of a printer 2 of a model controllable by the universal printer driver 43. The printer 2 of the model includes a controller 21, a printing unit 22, a network interface (NW I/F) 23, and an operation unit 24.

The controller 21 is provided with a CPU, a ROM, and a RAM. The CPU is configured to control each element of the printer 2 when executing various programs stored on the ROM. The ROM stores various kinds of programs and data. The CPU uses the RAM as a main memory when performing various processes.

The printing unit 22 includes a sheet tray configured to accommodate sheets, a feeding section configured to feed the sheets placed in the tray on a sheet-by-sheet basis, an image forming section configured to form an image on each of the sheets fed by the feeding section in an electrophotographic method or an inkjet method. The network interface 23 is connected communicably with an external device such as the PC 1 via the communication network 4.

The operation unit 24 includes a liquid crystal display device and various operation buttons. When operating the operation buttons, the user is allowed to configure various settings and issue a transmission instruction to transmit printer information of the printer 2 to the PC 1. The printer information is information for identifying the printer 2 on the same subnet. Specifically, the printer information may be an IP address of the printer 2, a printer name provided to the printer 2, or a combination of the IP address and the printer name. The printer name may be a model name of the printer 2 or a name provided independently of the model.

When issuing the transmission instruction, the user initially operates the operation unit 24 to specify the PC 1 as a destination to which the printer information is to be transmitted. To specify the PC 1 as the destination of the printer information, the user may directly input the IP address and/or the computer name of the PC 1. Alternatively, the user may select the IP address and/or the computer name of the PC 1 from listed data such as IP addresses and computer names of all computers connected with the printer 2 via the same subnet, which data may be acquired from a management computer that manages the subnet.

When receiving the transmission instruction from the user, the printer 2 sends the printer information to the PC 1 specified as the destination, in a unicast transmission manner. It is noted that "unicast transmission" is to send data to a single destination specified on a network.

(4) Universal Printer Driver

Figure 4:
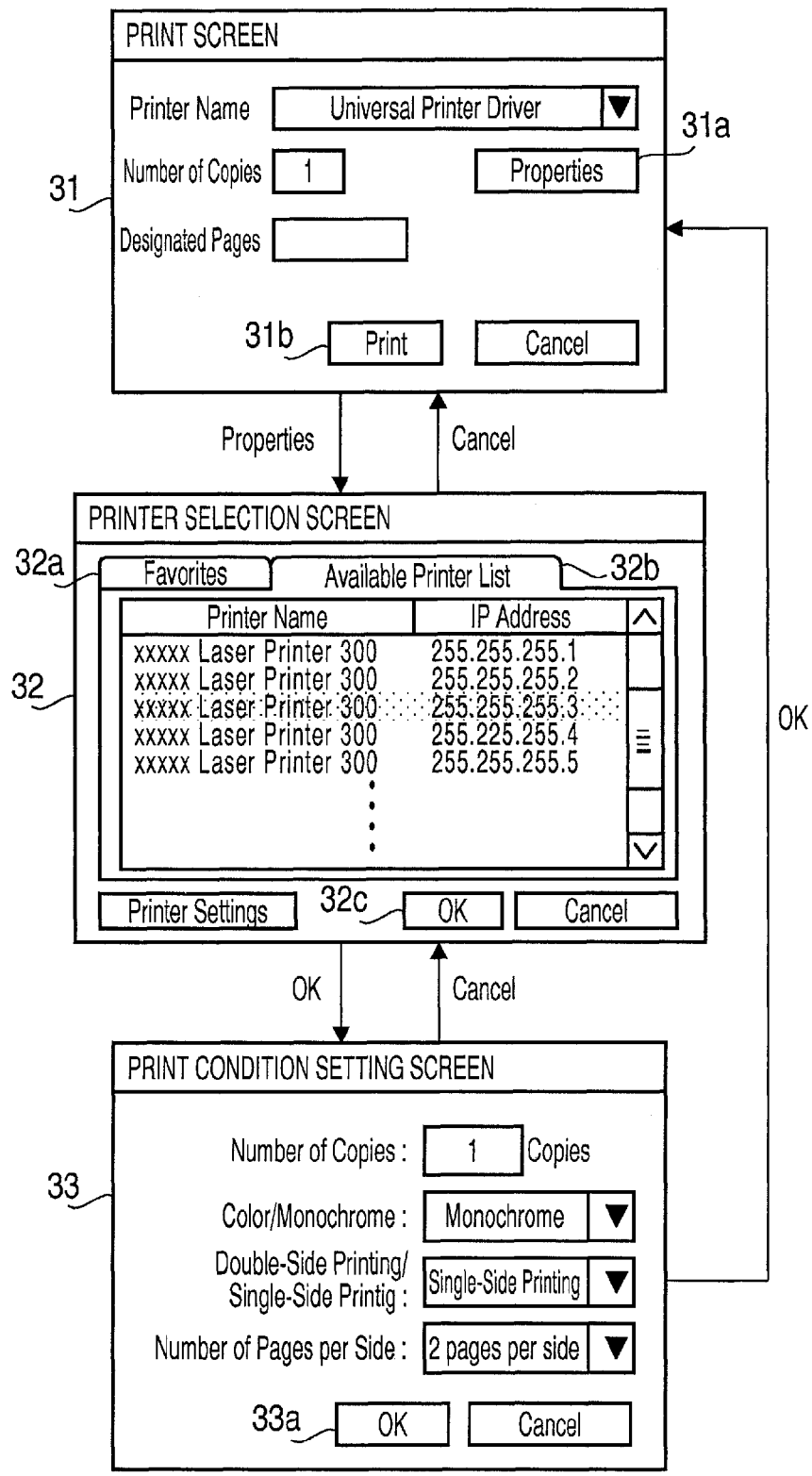
FIG. 4 illustrates a flow of a printing procedure using the universal printer driver in the first embodiment according to one or more aspects of the present invention.

FIG. 4 illustrates a flow of a printing procedure using the universal printer driver 43. When the user selects "Printing" on a menu window (not shown) displayed by the CPU 11 executing an application program 42 (hereinafter, which CPU will be simply referred to as an "application 42"), the application 42 displays a print screen 31.

On the print screen 31, the user is allowed to select the printer name of an intended printer 2 with which the user is to perform printing. The universal printer driver 43 is not a driver complying with only a specific printer 2. Hence, when wishing to perform printing using the universal printer driver 43, the user directly selects the universal printer driver 43. The following descriptions will be provided based on an assumption that the universal printer driver 43 is selected.

When the user clicks a "Properties" button 31a in a state where the universal printer driver 43 is selected, the application 42 calls the universal printer driver 43. When called by the application 42, the universal printer driver 43 displays a printer selection screen 32. As shown in FIG. 4, the printer selection screen 32 includes a "Favorites" tab 32a and an "Available Printer List" tab 32b.

The "Favorites" tab 32a is a screen to display identifiers (such as printer names and IP addresses) that had been selected on the "Available Printer List" tab 32b in the past. It is noted that the identifiers may only include either the printer names or the IP addresses. Further, the identifiers may be information for identifying the printers 2 other than the printer names and the IP addresses.

A default tab of the printer selection screen 32 is the "Favorites" tab 32a. Namely, the "Favorites" tab 32a is initially shown immediately after the printer selection screen 32 is displayed. The user is able to select the identifier(s) of an intended printer 2 from the identifiers listed on the "Favorites" tab 32a.

The "Available Printer List" tab 32b is a tab to display a list of identifiers of available printers 2 connected with the PC 1 via the same subnet. When selecting the identifier of a printer 2 that the user has not ever selected in the past, the user clicks the "Available Printer List" tab 32b. When the "Available Printer List" tab 32b is clicked, the universal printer driver 43 broadcasts a request for information such as the IP address and/or the printer name to each printer 2 connected with the PC 1 via the same subnet. Then, the universal printer driver 43 discriminates controllable printers 2 based on information transmitted by each printer 2 as a reply to the request, and lists the identifiers of the controllable printers 2 on the "Available Printer List" tab 32b.

The user is allowed to select the identifier of an intended printer 2 with which the user is to perform printing from the identifiers listed on the "Available Printer List" tab 32b. As will be described in detail later, there are two methods to select the identifier of the intended printer 2. One is a method to select the identifier by operating a mouse. The other is a method to select the identifier by issuing the transmission instruction via the operation unit 21 of the intended printer 2.

When the user selects the identifier of the intended printer 2, the background color of the selected identifier varies to represent that the identifier is put into a selected state. When the user clicks the "OK" button 32 in a situation where the identifier is in the selected state, the OS 41 sets a printer 2 corresponding to the selected identifier to a printer to be controlled by the universal printer driver 43.

When the user clicks an "OK" button 32c on the printer selection screen 32, the printer selection screen 32 is closed. Then, a print condition setting screen 33 for setting print conditions is displayed. When the user clicks an "OK" button 32c on the print condition setting screen 33, the print condition setting screen 33 is closed. Then, the print screen 31 is displayed again.

When the user clicks a "Print" button 31b on the print screen 31, the application 42 sends a print instruction to the universal printer driver 43. When receiving the print instruction from the application 42, the universal printer driver 43 creates print data based on the print instruction and the print conditions set on the print condition setting screen 33. Then, the universal printer driver 43 sends the created print data to the intended printer 2 corresponding to the identifier selected on the printer selection screen 32 to control the printer 2 to perform printing based on the print data.

(5) Selection of Identifier of Printer

As described above, the user is allowed to select the identifier of the intended printer 2 on the "Available Printer List" tab 32b in the two methods.

(5-1) Method to Select Identifier with Mouse

By clicking (selecting) with the mouse the identifier of the intended printer 2 from the identifiers listed on the "Available Printer List" 32b, the user is able to put the identifier into the selected state. In this respect, however, when selecting the identifier with the mouse, the user needs to grasp the identifier of the intended printer 2.

(5-2) Method to Select Identifier by Issuing Transmission Instruction on Printer In a situation where the "Favorites" tab 32a or the "Available Printer List" 32b is displayed, the user once leaves the PC 1 and moves to a location where the intended printer 2 is placed. Then, on the intended printer 2, the user specifies the PC 1 as the destination and issues the transmission instruction to send the printer information to the PC 1.

When receiving the printer information from the printer 2 via the network interface 15, the universal printer driver 43 switches to the "Available Printer List" tab 32b in the case where the "Favorites" tab 32a is displayed. Then, the universal printer driver 43 puts the identifier of the printer 2 identified based on the received printer information into the selected state. Thereby, the user is able to put the identifier of the intended printer 2 into the selected state.

Figure 5:
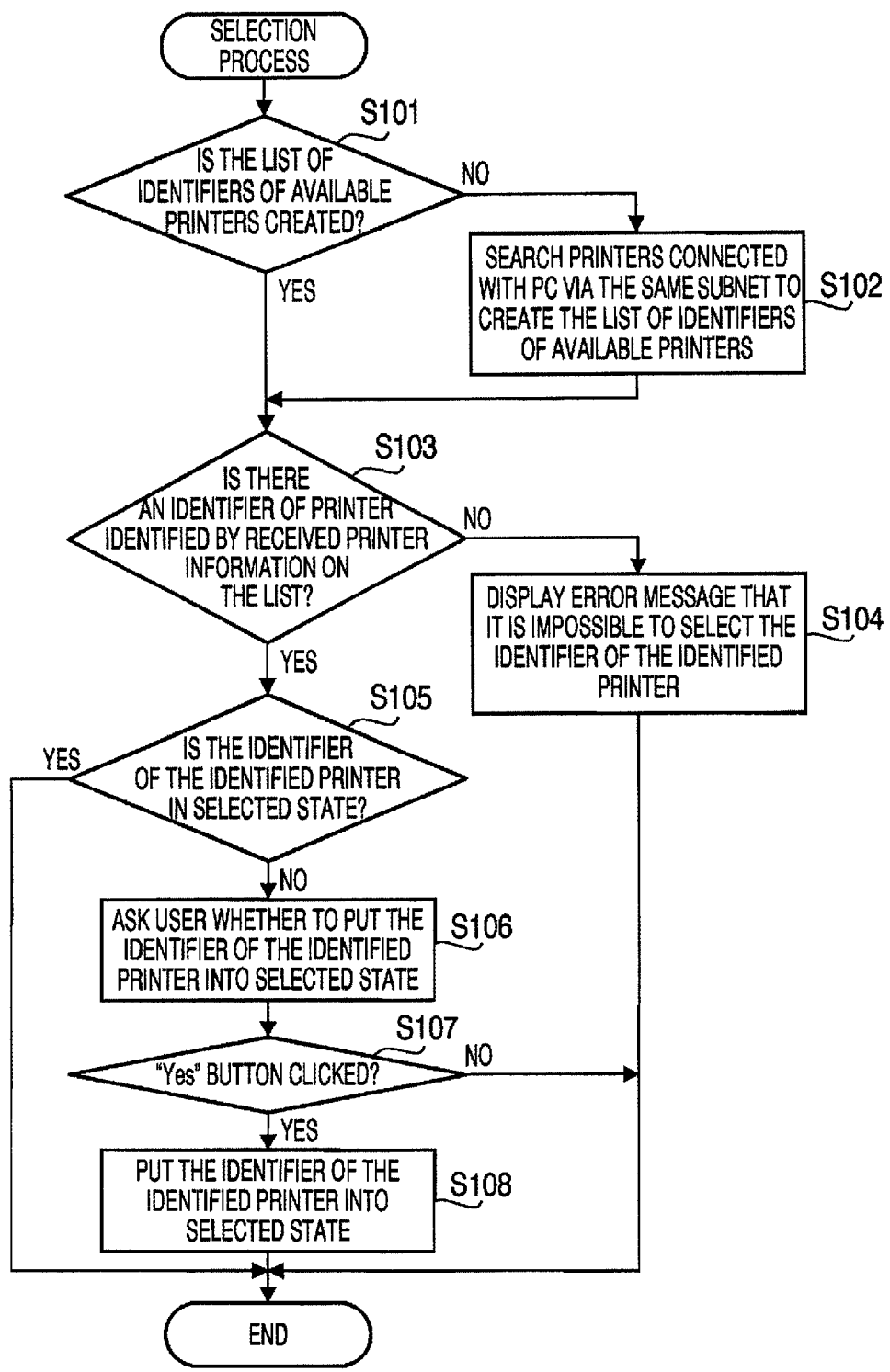
FIG. 5 is a flowchart showing a procedure of a selection process in the first embodiment according to one or more aspects of the present invention.

FIG. 5 is a flowchart showing a procedure of a selection process to be executed by the universal printer driver 43 (the controller 10) in the aforementioned method to select the identifier by issuing the transmission instruction on the printer 2. The universal printer driver 43 (the controller 10) launches the selection process when receiving the printer information via the network interface 15 in a situation where the "Favorites" tab 32a or the "Available Printer List" tab 32b is displayed. It is noted that the printer information received by the PC 1 is printer information sent to the PC 1 in the unicast transmission manner.

In S101, the universal printer driver 43 (the controller 10) determines whether the list of the identifiers of the available printers 2 is created. For example, when the "Available Printer List" tab 32b is not yet displayed after the "Favorites" tab 32a has been displayed, the list of the identifiers of the available printers 2 is not created. In this case, the universal printer driver 43 determines that the list of the identifiers of the available printers 2 is not created. When determining that the list of the identifiers of the available printers 2 is not created (S101: No), the universal printer driver 43 goes to S102. In the meantime, when determining that the list of the identifiers of the available printers 2 is created (S101: Yes), the universal printer driver 43 goes to S103.

In S102, the universal printer driver 43 searches the printers 2 connected with the PC 1 via the same subnet to create the list of the identifiers of the available printers 2.

In S103, the universal printer driver 43 determines whether the identifier of a printer 2 identified by the printer information received from the printer 2 is on the list of the identifiers of the available printers 2. For example, even though the identified printer 2 is configured to send its printer information to the PC 1 in response to acceptance of the transmission instruction issued by the user, the universal printer driver 43 may be unable to control the identified printer 2. In such a case, the universal printer driver 43 determines that the identifier of the identified printer 2 is not on the list of the identifiers of the available printers 2. When determining that the identifier of the identified printer 2 is not on the list of the identifiers of the available printers 2 (S103: No), the universal printer driver 43 goes to S104. Meanwhile, when determining that the identifier of the identified printer 2 is on the list of the identifiers of the available printers 2 (S103: Yes), the universal printer driver 43 goes to S105.

In S104, the universal printer driver 43 displays on the display unit 14 an error message window 34 as exemplified in FIG. 6 to provide a notification that it is impossible to select the identifier of the identified printer 2. When an "OK" button is clicked on the error message window 34, the universal printer driver 43 terminates the process.

In S105, the universal printer driver 43 determines whether the identifier of the identified printer 2 is in the selected state on the "Available Printer List" tab 32*b*. When determining that the identifier of the identified printer 2 is not in the selected state (S105: No), the universal printer driver 43 goes to S106. Meanwhile, when determining that the identifier of the identified printer 2 is in the selected state (S105: Yes), the universal printer driver 43 terminates the process.

In S106, the universal printer driver 43 displays on the display unit 14 a printer change window 35 as exemplified in FIG. 7 to ask the user whether to put the identifier of the identified printer 2 into the selected state. In S107, the universal printer driver 43 determines whether a "Yes" button has been clicked on the printer change window 35 (i.e., whether the user has determined to put the identifier of the identified printer 2 into the selected state). When determining that the "Yes" button has been clicked (S107: Yes), the universal printer driver 43 goes to S108. Meanwhile, when determining that a "No" button has been clicked on the printer change window 35 (S107: No), the universal printer driver 43 terminates the process.

In S108, when the "Favorites" tab 32*a* is displayed, the universal printer driver 43 displays the "Available Printer List" tab 32*b* to replace the "Favorites" tab 32*a*, and shows the created list on the "Available Printer List" tab 32*b*. Then, when a different identifier is already in the selected state, the universal printer driver 43 cancels the selected state of the different identifier and puts the identifier of the identified printer 2 into the selected state.

(6) Advantages of First Embodiment

Suppose, for instance, the user who usually works with the PC 1 connected with the subnet N1 (see FIG. 1) moves to a different location carrying the PC 1 for a certain reason, there connects the PC 1 with the subnet N2, and wishes to make the printer 2*f* connected with the subnet N2 perform printing. In this case, since the user usually uses a printer 2 connected with the subnet N1, the user may not know which identifiers correspond to a printer name and an IP address of the printer 2*f* even if the printer names and IP addresses of the printers 2 connected with the subnet N2 are listed on the "Available Printer List" tab 32*b*.

In such a case, according to the universal printer driver 43 of the first embodiment, when issuing the transmission instruction on the printer 2*f* with the PC 1 specified as the destination of the printer information of the printer 2*f*, the user is allowed to have the identifier of the printer 2*f* put into the selected state on the "Available Printer List" tab 32*b*. Namely, according to the universal printer driver 43 of the first embodiment, even though the user does not know the identifier of the intended printer 2, the user is allowed to select the identifier of the intended printer 2 from the listed identifiers. Thereby, the user is not required to check the identifier of the intended printer 2 by himself (herself). Thus, it is possible to enhance user-friendliness of the communication network 4.

Further, when the identifier of the printer 2 identified by the printer information received via the network interface 15 is not on the list of the identifiers of the available printers 2, the universal printer driver 43 provides the user with a notification that it is impossible to put the identifier of the identified printer 2 into the selected state. In other words, when the identifier of the identified printer 2 is not included in the list of the identifiers of the available printers 2, the universal printer driver 43 provides the user with a notification that it is impossible to put the identifier of the identified printer 2 into the selected state. Thereby, the user is able to know that it is impossible to select the printer 2 on which the user has issued the transmission instruction.

Further, when the identifier of the printer 2 identified by the printer information received via the network interface 15 is not in the selected state, the universal printer driver 43 asks the user whether to put the identifier of the identified printer 2 into the selected state. Therefore, even after issuing the transmission instruction to put the identifier of the intended printer 2 into the selected state, when wishing to make a different printer 2 perform printing after that, the user is allowed to prevent the identifier of the printer 2 on which the user has issued the transmission instruction from being put into the selected state, by making a choice not to put the identifier into the selected state.

Further, according to the universal printer driver 43, it is possible to control the printer 2 corresponding to the identifier in the selected state to perform printing.

Further, according to the printers 2 of the first embodiment, by issuing the transmission instruction on the intended printer 2, the user is allowed to send the printer information for identifying the intended printer 2 to the PC 1. Thereby, even though the user does not know the identifier of the intended printer 2, the user is able to select the identifier of the intended printer 2 from the identifiers listed on the "Available Printer List" tab 32*b*.

Second Embodiment

Subsequently, a second embodiment according to aspects of the present invention will be described with reference to FIGS. 8 to 12. FIG. 8 is a block diagram showing a logical configuration of the universal printer driver 43 in the second embodiment. As shown in FIG. 8, the universal printer driver 43 of the second embodiment includes a reception program 51 and a selection program 52.

The reception program 51 is configured to receive the printer information from a printer 2 via the network interface 15. The reception program 51 is executed as a resident program, which is referred to for instance as "Service" in Microsoft Windows (trademark registered) or "Daemon" in UNIX (trademark registered).

When receiving the printer information from a printer 2, the reception program 51 determines whether the selection program 52 is being executed. When determining that the selection program 52 is being executed, the reception program 51 transfers the received printer information to the selection program 52. Meanwhile, when determining that the selection program 52 is not being executed, the reception program 51 stores the received printer information onto the storage nit 17. It is noted that the printer information may be stored on the RAM 13.

The selection program 52 is a program corresponding to the universal printer driver 43 of the first embodiment. Nonetheless, when launched, the selection program 52 initially displays the "Available Printer List" tab 32*b* instead of the "Favorites" tab 32*a* in the case where the printer information is stored on the storage unit 17. Then, the selection program 52 puts the identifier of the printer 2 identified by the stored printer information.

In the following descriptions, detailed explanations will be provided about the reception program 51 and the selection program 52.

(1) Reception Program

FIG. 9 is a flowchart showing a procedure of a process to be performed when the reception program 51 is executed. The reception program 51 (the controller 10) launches the process when receiving the printer information from a printer 2 via the network interface 15. It is noted that the printer information received by the PC 1 is printer information sent to the PC 1 in the unicast transmission manner.

In S201, the reception program 51 (the controller 10) determines whether the selection program 52 is being executed. When determining that the selection program 52 is being executed (S201: Yes), the reception program 51 goes to S202. Meanwhile, when determining that the selection program 52 is not being executed (S201: No), the reception program 51 goes to S203. In S202, the reception program 51 transfers the received printer information to the selection program 52.

In S203, the reception program 51 determines whether different printer information is already stored on the storage unit 17. When determining that different printer information is not stored on the storage unit 17 (S203: No), the reception program 51 goes to S204. Meanwhile, when determining that different printer information is stored on the storage unit 17 (S203: Yes), the reception program 51 goes to S205. In S204, the reception program 51 stores the received printer information onto the storage unit 17. In S205, the reception program 51 additionally stores the received printer information onto the storage unit 17.

(2) Selection Program

FIGS. 10 and 11 illustrate a flowchart showing a procedure of a process to be performed when the selection program 52 is launched. The selection program 52 is launched when the "Properties" button 31*a* is clicked and the universal printer driver 43 is called by the application 42. In the following descriptions, operations that are substantially the same as those of the first embodiment will be provided with the same reference characters as the first embodiment, and explanations about the operations will be omitted.

In S301, the selection program 52 (the controller 10) issues a request for printer information to the reception program 51. In response to receipt of the request for printer information, when the storage unit 17 stores one or more pieces of printer information, the reception program 51 transfers all the stored printer information to the selection program 52. Meanwhile, when the storage unit 17 does not store any printer information, the reception program 51 provides the selection program 52 with a notification that there is not printer information stored.

In S302, the selection program 52 determines whether there is printer information stored on the storage unit 17. Specifically, when the reception program 51 transfers one or more pieces of printer information, the selection program 52 determines that there is printer information stored on the storage unit 17. Meanwhile, when receiving from the reception program 51 the notification that there is not printer information stored, the selection program 52 determines that there is not printer information stored on the storage unit 17. When determining that there is printer information stored on the storage unit 17 (S302: Yes), the selection program 52 goes to S303. Meanwhile, when determining that there is not printer information stored on the storage unit 17 (S302: No), the selection program 52 terminates the process. When the process is terminated, the "Favorites" tab 32*a* is initially displayed in the same manner as the first embodiment.

In S303, the selection program 52 asks the user whether to put the identifier of a printer 2 identified by the stored printer information into the selected state. In S304, the selection program 52 determines whether there are two or more pieces of printer information stored on the storage unit 17. Specifically, when the reception program 51 transfers two or more pieces of printer information, the selection program 52 determines that there are two or more pieces of printer information stored on the storage unit 17. Meanwhile, when the reception program 51 transfers only one piece of printer information, the selection program 52 determines that there are not two or more pieces of printer information stored on the storage unit 17. When determining that there are two or more pieces of printer information stored on the storage unit 17 (S304: Yes), the selection program 52 goes to S305. When determining that there are not two or more pieces of printer information stored on the storage unit 17 (S304: No), the selection program 52 goes to S103.

In S305, the selection program 52 displays, on the display unit 14, a printer information selection screen 36 as shown in FIG. 12 to prompt the user to select printer information of a printer 2 of which the identifier is to be put into the selected state, from a plurality of pieces of printer information displayed.

The user may not determine which is the printer information of the intended printer 2 even when looking at the plurality of pieces of printer information displayed. Therefore, the selection program 52 displays on the printer information selection screen 36 the order in which each printer information has been stored, as well as the printer information. The user who has issued the transmission instructions must grasp the association between each printer 2 and the order in which the printer information of each printer 2 has been stored. Accordingly, by reference to the orders, the user is allowed to select the printer information of an intended one of the printers 2 on each of which the user has issued the transmission instruction. It is noted that, instead of the orders in which the transmission instructions have been issued, clock times when the transmission instructions have been issued may be displayed. With respect to the other aspects, the second embodiment is substantially the same as the first embodiment.

According to the universal printer driver 43 of the second embodiment, even when printer information is transmitted by a printer 2 before execution of the selection program 52, in response to the selection program 52 being launched, the identifier of the printer 2 identified by the printer information is put into the selected state. Accordingly, the user is allowed to issue the transmission instruction on the printer 2 when the selection program 52 is not executed, and thus it enhances user-friendliness of the communication network 4.

Further, in the case where there are a plurality of pieces of printer information stored on the storage unit 17 when the selection program 52 is launched, the universal printer driver 43 prompts the user to select one of the plurality of pieces of printer information. Therefore, even when receiving the plurality of pieces of printer information before execution of the selection program 52, the universal printer driver 43 puts into the selected state the identifier of the printer 2 identified by the user-selected printer information.

Third Embodiment

Subsequently, a third embodiment according to aspects of the present invention will be described, which is a modification of the second embodiment. In the aforementioned second embodiment, in the case where there is already printer information stored on the storage unit 17 when the reception program 51 newly receives printer information from a printer 2 via the network interface 15, the reception program 51 additionally stores the received printer information onto the storage unit 17. Meanwhile, in the third embodiment, the printer information stored on the storage unit 17 is replaced (overwritten) with the received printer information. Accordingly, in the third embodiment, only a single piece of printer information is stored on the storage unit 17. When the user has issued transmission instructions on a plurality of printers 2 before execution of the selection program 52, the printer information of the printer 2 on which the user has issued the last transmission instruction is only stored on the storage unit 17.

Further, since only a single piece of printer information is stored on the storage unit 17, the selection program 52 does not perform S204 and S205. With respect to the other aspects, the third embodiment is substantially the same as the second embodiment.

According to the universal printer driver 43 of the third embodiment, in the case where there is already printer information stored on the storage unit 17 when the reception program 51 newly receives printer information, the printer information that has already been stored on the storage unit 17 is replaced (overwritten) with the received printer information. Therefore, it is possible to put into the selected state the identifier of the printer 2 identified by the latest printer information.

Fourth Embodiment

Subsequently, a fourth embodiment according to aspects of the present invention will be described with reference to FIG. 13. In the aforementioned first embodiment, when the user issues the transmission instruction on a printer 2, the user is made specify the PC 1 as a destination computer to which the printer information is to be transmitted. Meanwhile, in the fourth embodiment, the user is not made to specify the PC 1, and the printer information is broadcasted.

In this respect, however, when the printer 2 broadcasts the print information, the universal printer driver 43 executed by a computer connected with the printer 2 via the same subnet cannot determine whether an intended destination of the printer information is the computer. In consideration of such a problem, in the fourth embodiment, when the user issues the transmission instruction on a printer 2, the printer 2 causes (prompts) the user to specify a user ID used when the user logs in to the OS 41 executed by the PC 1 and broadcasts the printer information and the user ID. Thereby, the PC 1, connected with the printer 2 via the same subnet, receives the printer information and the user ID from the printer 2. It is noted that the printer 2 may cause the user to specify any information for identifying the user who logs in to the OS 41, instead of the user ID. For example, the printer may cause the user to specify a name of the user.

FIG. 13 is a flowchart showing a procedure of a process to be performed when the reception program 51 is executed in the fourth embodiment. Here, operations that are substantially the same as those of the second embodiment will be provided with the same reference characters, and explanations about the operations will be omitted.

In S401, the reception program 51 (the controller 10) determines whether the received user ID is identical to the user ID of the user who currently logs in to the OS 41 executed by the PC 1 that executes the reception program 51. When determining that the received user ID is identical to the user ID of the user who currently logs in to the OS 41 (S401: Yes), the reception program 51 determines that the intended destination of the printer information is the PC1, and goes to S201. Meanwhile, when determining that the received user ID is not identical to the user ID of the user who currently logs in to the OS 41 (S401: No), the reception program 51 determines that the intended destination of the printer information is a computer other than the PC1, discards the printer information, and terminates the process. Consequently, when the intended destination of the printer information received via the network interface 15 is the PC 1, the selection program 52 puts the identifier of the printer 2 identified by the received printer information into the selected state. Meanwhile, when the intended destination of the printer information received via the network interface 15 is not the PC 1, the selection program 52 does not put the identifier of the printer 2 identified by the received printer information into the selected state. With respect to the other aspects, the fourth embodiment is substantially the same as the second embodiment.

In the fourth embodiment, when broadcasting the printer information, the universal printer driver 43 also transmits the user ID as information representing the intended destination of the printer information. Thus, it is possible to prevent the identifier of the printer 2 identified by the transmitted printer information from being put into the selected state on all computers connected with the identified printer 2 via the same subnet.

Fifth Embodiment

Next, a fifth embodiment according to aspects of the present invention will be described with reference to FIG. 14. In the aforementioned second embodiment, when the selection program 52 is launched, the selection program 52 sends a request for printer information to the reception program 51. In the fifth embodiment, the reception program 51 monitors whether the selection program 52 is launched, and transfers the printer information to the selection program 52 when the selection program 52 is launched.

FIG. 14 is a flowchart showing a procedure of a process to be performed when the reception program 51 detects that the selection program 52 is launched. The process is started in response to the reception program 51 detecting that the selection program 52 is launched.

In S501, the reception program 51 (the controller 10) determines whether there is printer information stored on the storage unit 17. When determining that there is printer information stored on the storage unit 17 (S501: Yes), the reception program 51 goes to S502. Meanwhile, when determining that there is not printer information stored on the storage unit 17 (S501: No), the reception program 51 terminates the process. In S502, the reception program 51 sends to the selection program 52 the printer information stored on the storage unit 17.

In the fifth embodiment, the selection program 52 does not perform "the process to be performed when the selection program 52 is launched" described in the second embodiment. This is because when the reception program 51, which has detected that selection program 52 has been launched, sends the printer information, it is only necessary for the selection program 52 to perform the same process as the selection process described in the first embodiment.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

Modifications

In the aforementioned first embodiment, when the identifier of the printer 2 identified by the received printer information is not in the selected state on the "Available Printer List" tab 32b, the user is asked whether to put the identifier of the identified printer 2 into the selected state. However, the identifier of the identified printer 2 may be put into the selected state without asking the user whether to put the identifier of the identified printer 2 into the selected state.

In the aforementioned first embodiment, when the identifier of the printer 2 identified by the received printer information is not on the list of the identifiers of the available printers 2, the error message window 34 for informing that it is impossible to select the identifier of the identified printer 2 is displayed on the display unit 14. However, the error message window 34 may not necessarily have to be displayed.

In the aforementioned first embodiment, the two methods to select the identifier of the intended printer 2 on the "Available Printer List" tab 32b have been exemplified. However, only one, of the two methods, to select the identifier of the intended printer 2 by issuing the transmission instruction on the intended printer 2 may be applied.

In the aforementioned second embodiment, when the selection program 52 is launched, the selection program 52 issues a request for printer information to the reception program 51. However, the selection program 52 may directly access the storage unit 17 and determine whether there is printer information stored on the storage unit 17. Further, when determining that there is printer information stored on the storage unit 17, the selection program 52 may directly read out the printer information from the storage unit 17 without involving the reception program 51.

In the aforementioned fourth embodiment, when the printer information is broadcasted, the user is made specify the user ID. However, the user may not be made specify the user ID. In this case, the printer information is sent to all computers connected with the printer 2 on which the user has issued the transmission instruction via the same subnet. Further, the universal printer driver 43 executed by each computer cannot determine whether the intended destination of the printer information is the computer. In such a case, in the same manner as the first embodiment, the universal printer driver 43 may ask the user whether to put into the selected state the identifier of the printer 2 identified by the received printer information.

In the aforementioned first embodiment, the identifier of the printer 2 identified by the received printer information is put into the selected state on the "Available Printer List" tab 32b. However, the identifier of the printer 2 identified by the received printer information may be not put into the selected state but displayed in a discriminable manner. Further, the identifier displayed in a discriminable manner may be put into the selected state when the user clicks the identifier with the mouse. In this case, the selection process may include a process to display the identifier of the printer 2 identified by the received printer information in a discriminable manner and a process to put the identifier clicked (selected) by the user into the selected state. Moreover, methods to display the identifier in a discriminable manner may include a method to display the identifier in a flashing manner and a method to display a predetermined mark near the identifier, any of which methods may be selected as needed.

In the aforementioned embodiments, as a device to be selected, the printer 2 is exemplified. However, the device to be selected may be a scanner.

In the aforementioned first embodiment, in S103, when determining that the identifier of the printer 2 identified by the received printer information is not on the list of the identifiers of the available printers 2 (S103: No), the universal printer driver 43 goes to S104, in which the universal printer driver 43 displays on the display unit 14 the error message window 34. Instead, the universal printer driver 43 may provide a notification that a printer 2 uncontrollable by the universal printer driver 43 is selected. There may be a printer 2 on the same subnet, which printer cannot be controlled by the universal printer driver 43 owing to inconsistency between the emulation of the printer 2 and the emulation controllable by the universal printer driver 43. Even in such a case, the user is allowed to confirm that the user selects a printer 2 that the universal printer driver 43 cannot control, and thus to reselect another printer 2.

What is claimed is:

1. A device selecting apparatus comprising:
a communication unit configured to communicate with a plurality of devices comprising a plurality of available devices that are controllable by the device selecting apparatus and a plurality of unavailable devices that are not controllable by the device selecting apparatus, wherein the plurality of available devices comprise:
a first device comprising:
a first input device configured to receive a user operation of inputting a first instruction, and
a first controller comprising a first processor and a first memory, the first processor being configured to execute controller-executable instructions stored in the first memory to, in response to the first input device receiving the first instruction, send first device information to the device selecting apparatus; and a second device comprising:
a second input device configured to receive a user operation of inputting a second instruction, and
a second controller comprising a second processor and a second memory, the second processor being configured to execute controller-executable instructions stored in the second memory to, in response to the second input device receiving the second instruction, send second device information to the device selecting apparatus;

a display configured to display a list of device identifiers of the plurality of available devices, each of the device identifiers identifying a corresponding device;

a third memory;

a controller comprising a processor, the controller being configured to execute controller-executable instructions to:
receive device information transmitted in a unicast manner from one particular device from among the plurality of available devices such that a device search request to the one particular device is not required, the plurality of available devices being connected with the device selecting apparatus via the communication unit;
in response to receiving the device information from the one particular device, determine whether the list of device identifiers of the plurality of available devices is stored in the third memory,
when determining that the list of device identifiers of the plurality of available devices is not stored in the third memory, perform the steps of:
transmitting the device search request to each of the plurality of devices via the communication unit;
receiving a reply to the device search request from each of the plurality of devices via the communication unit;
discriminating the plurality of available devices from among the plurality of devices based on the reply received from each of the plurality of devices; and
storing the list of device identifiers of the plurality of available devices in the third memory;
control the display to:
display the list of device identifiers of the available devices stored in the third memory, the device identifiers comprising a first device identifier that identities the first device and a second device identifier that identifies the second device; and
display all of the device identifiers in a first display mode; and
determine whether an identifier of the one particular device, identified by the received information received from the one particular device, is on the list of device identifiers of the plurality of available devices;
when determining that the identifier of the one particular device is not on the list of the device identifiers of the plurality of available devices, provide a notification that it is not possible to select the identifier of the one particular device;
when determining that the identifier of the one particular device is the first device identifier of the first device on the list of device identifiers of the plurality of available devices:
determine that it is possible to select the first device identifier; and change a display mode of the first device identifier of the first device to a second display mode while controlling the display to display, in the first display mode, one or more other device identifiers of one or more other devices, including the second device, which have not transmitted the device information, the second display mode being distinguishable from the first display mode of each other device identifier in the list displayed on the display of the device selecting apparatus;
when determining that the identifier of the one particular device is the second device identifier of the second device on the list of device identifiers of the plurality of available devices:
determine that it is possible to select the second device identifier; and change a display mode of the second device identifier of the second device to the second display mode while controlling the display to display, in the first display mode, one or more other device identifiers of one or more of the other devices, including the first device, which have not transmitted the device information.

2. A printing system comprising:
a computer;
a plurality of printers comprising a plurality of available printers that are controllable by the computer and a plurality of unavailable printers that are not controllable by the computer, the plurality of available printers comprising:
a first printer comprising:
a first printing unit configured to print an image on a sheet;
a first printer-side network interface configured to be connected with a communication network;
a first input device configured to accept a user operation of inputting a first transmission instruction to transmit first printer information for identifying the first printer; and
a first printer-side controller comprising a first processor and a first memory, the first processor being configured to execute controller-executable instructions stored in the first memory to transmit the first printer information via the first printer-side network interface in response to accepting the first transmission instruction via the first input device; and
a second printer comprising:
a second printing unit configured to print an image on a sheet;
a second printer-side network interface configured to be connected with the communication network;
a second input device configured to accept a user operation of inputting a second transmission instruction to transmit second printer information for identifying the second printer; and
a second printer-side controller comprising a second processor and a second memory, the second processor being configured to execute controller-executable instructions stored in the second memory to transmit the second printer information via the second printer-side network interface in response to accepting the second transmission instruction via the second input device,
wherein the computer comprises:
a computer-side network interface configured to communicate with the plurality of printers via the communication network; and a display configured to display a list of printer identifiers of the plurality of available printers, each of the printer identifiers identifying a corresponding printer;

a computer-side memory;

a computer-side controller comprising a third processor, the third processor being configured to execute controller-executable instructions to:

receive printer information transmitted in a unicast manner from one particular printer from among the plurality of available printers such that a printer search request to the one particular printer is not required, the plurality of available, the plurality of available printers being connected with the computer-side network interface via the communication network;

in response to receiving the printer information from the one particular printer, determine whether the list of printer identifiers of the plurality of available printers is stored in the computer-side memory;

when determining that the list of printer identifiers of the plurality of available printers is not stored in the computer-side memory, perform the steps of:

transmitting the printer search request to each of the plurality of printers via the communication network;

receiving a reply to the printer search request from each of the plurality of printers via the communication network;

discriminating the plurality of available printers from among the plurality of printers based on the reply received from each of the plurality of printers; and storing the list of printer identifiers of the plurality of available printers in the computer-side memory;

control the display to:

display the list of printer identifiers of the plurality of available printers stored in the computer-side memory, the printer identifiers comprising a first printer identifier that identifies the first printer and a second printer identifier that identifies the second printer; and display all of the printer identifiers being displayed in a first display mode;

determine whether an identifier of the one particular printer, identified by the printer information received from the one particular printer, is on the list of printer identifiers of the plurality of available printers;

when determining that the identifier of the one particular printer is not on the list of the printer identifiers of the plurality of available printers, provide a notification that it is not possible to select the identifier of the one particular printer;

when determining that the identifier of the one particular printer is the first printer identifier of the first printer on the list of the printer identifiers of the plurality of available printers:

determine that it is possible to select the first printer identifier; and change a display mode of the first printer identifier of the first printer to a second display mode while controlling the display to display, in the first display mode, one or more other printer identifiers of one or more other printers, including the second printer, which have not transmitted the printer information, the second display mode being distinguishable from the first display mode of each other printer identifier in the list of identifiers displayed by the display of the computer;

when determining that the identifier of the one particular printer is the second printer identifier of the second printer on the list of the printer identifiers of the plurality of available printers:

determine that it is possible to select the second printer identifier; and change a display mode of the second printer identifier of the second printer to the second display mode while controlling the display to display, in the first display mode, one or more other printer identifiers of one or more other printers, including the first printer which have not transmitted the printer information.

3. A non-transitory computer-readable medium storing computer-readable instructions that are executable by a processor coupled with a device selecting apparatus comprising a communication unit configured to communication with a plurality of available devices that are controllable by the device selecting apparatus and a plurality of unavailable devices that are not controllable by the device selecting apparatus, a display configured to display a list of device identifiers each identifying a corresponding device, and a memory configured to store the list of device identifiers, the instructions being configured to, when executed by the processor, cause the processor to:

receive device information transmitted in a unicast manner from one particular device from among the plurality of available devices such that a device search request to the one particular device is not required, the available devices comprising a first device and a second device;

in response to receiving the device information from the one particular device, determine whether the list of printer identifiers of the plurality of available devices is stored on the memory, when determining that the list of device identifiers of the plurality of available devices is not stored in the memory, perform the steps of:

transmitting the device search request to each of the plurality of devices via the communication unit;

receiving a reply to the device search request from each of the plurality of devices via the communication unit;

discriminating the plurality of available devices from among the plurality of devices based on the reply received from each of the plurality of printers; and storing the list of device identifiers of the plurality of available devices in the memory;

control the display to:

display the list of device identifiers of the plurality of available devices stored in the memory, the device identifiers comprising a first device identifier that identifies the first device and a second device identifier that identifies the second device; and display all of the device identifiers in a first display mode; determine whether an identifier of the one particular device, identified by the device information received from the one particular device, is on the list of device identifiers of the plurality of available devices;

when determining that the identifier of the one particular device is not on the list of the device identifiers of the plurality of available devices, provide a notification that it is not possible to select the identifier of the one particular device;

when determining that the identifier of the one particular device is the first device identifier of the first device on the list of device identifiers of the plurality of available devices:

determine that it is possible to select the first device identifier; and change a display mode of the first device identifier of the first device to a second display mode while controlling the display to display, in the first display mode, one or more other device identifiers of one or more other devices, including the second device, which have not transmitted the device information, the second display mode being distinguishable from the first display mode of each other device identifier in the list displayed on the display of the device selecting apparatus;

when determining that the identifier of the one particular device is the second device identifier of the second device on the list of device identifiers of the plurality of available devices:
  determine that it is possible to select the second device identifier; and
  change a display mode of the second device identifier of the second device to the second display mode while controlling the display to display, in the first display mode, one or more other device identifiers of one or more other devices, including the first device, which have not transmitted the device information.

4. The device selecting apparatus according to claim 1, wherein:
  the communication unit is further configured to communicate with a third device comprising a third input device that is configured to receive a user operation of inputting a third instruction, the third device being configured to, in response to the third input device receiving the third instruction, send third device information to the device selecting apparatus;
  the list of the device identifiers does not include the third device identifier that identifies the third device; and
  the controller is further configured to, in response to receiving the third device information from the third device, control the display to display a notification that the list of the device identifiers does not include the third device identifier.

5. The printing system according to claim 2, further comprising:
  a third printer comprising:
    a third printing unit configured to print an image on a sheet;
    a third printer-side network interface configured to be connected with the communication network; and
    a third input device configured to accept a user operation of inputting a third transmission instruction to transmit third printer information for identifying the third printer;
  wherein the computer-side network interface is further configured to communicate with the third device;
  wherein the list of identifiers does not include the third printer identifier that identifies the third printer; and
  wherein the computer-side controller is further configured to, in response to receiving the third printer information from the third printer, control the display to display a notification that the list of the printer identifiers does not include the third printer identifier.

6. The non-transitory computer readable medium instructions according to claim 3, wherein:
  the instructions further cause the processor to receive third device information for identifying a third device, the third device information being transmitted from the third device when a user operation of inputting a third instruction is received at the third device via a third input device;
  the list of the identifiers does not include the third device identifier that identifies the third device; and
  in response to receiving the third device information from the third device, the instructions further cause the processor to control the display to display a notification that the list of the device identifiers does not include the third device identifier.

* * * * *

UNITED STATES PATENT AND TRADEMARK OFFICE
CERTIFICATE OF CORRECTION

PATENT NO. : 9,690,529 B2
APPLICATION NO. : 13/335828
DATED : June 27, 2017
INVENTOR(S) : Mareyuki Murata Page 1 of 1

It is certified that error appears in the above-identified patent and that said Letters Patent is hereby corrected as shown below:

In the Claims

Claim 2, Column 17, Line 39, please delete "being displayed" from the phrase "display all of the printer identifiers being displayed in a first display mode"

Signed and Sealed this
Sixth Day of March, 2018

Andrei Iancu
*Director of the United States Patent and Trademark Office*